United States Patent
Saito et al.

(10) Patent No.: US 11,428,910 B2
(45) Date of Patent: Aug. 30, 2022

(54) CONVERTER LENS, INTERCHANGEABLE LENS, AND IMAGE-CAPTURING APPARATUS

(71) Applicant: CANON KABUSHIKI KAISHA, Tokyo (JP)

(72) Inventors: Shinichiro Saito, Utsunomiya (JP); Hiroki Ebe, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 101 days.

(21) Appl. No.: 17/092,373

(22) Filed: Nov. 9, 2020

(65) Prior Publication Data
US 2021/0149165 A1 May 20, 2021

(30) Foreign Application Priority Data
Nov. 14, 2019 (JP) .............................. JP2019-206289

(51) Int. Cl.
*G02B 13/16* (2006.01)
*G02B 9/12* (2006.01)
*G02B 7/14* (2021.01)

(52) U.S. Cl.
CPC .............. *G02B 13/16* (2013.01); *G02B 7/14* (2013.01); *G02B 9/12* (2013.01)

(58) Field of Classification Search
CPC . G02B 13/16; G02B 7/14; G02B 9/12; G02B 15/10; G02B 27/0018; G02B 13/005; G02B 13/006
See application file for complete search history.

(56) References Cited

U.S. PATENT DOCUMENTS

| 4,206,971 | A | 6/1980 | Hamanishi et al. |
| 9,851,626 | B2 * | 12/2017 | Nakamura ............. G02B 15/10 |
| 10,718,929 | B2 | 7/2020 | Saito et al. |
| 2013/0308034 | A1 | 11/2013 | Ogata |
| 2014/0118603 | A1 | 5/2014 | Saito |
| 2016/0223799 | A1 | 8/2016 | Yoneyama |

(Continued)

FOREIGN PATENT DOCUMENTS

| CN | 102033303 A | 4/2011 |
| CN | 105319693 A | 2/2016 |

(Continued)

OTHER PUBLICATIONS

Notification of the First Office Action issued by the China National Intellectual Property Administration dated Jun. 28, 2022 in corresponding CN Patent Application No. 202011247578.9, with English translation.

*Primary Examiner* — James C. Jones
(74) *Attorney, Agent, or Firm* — Carter, DeLuca & Farrell LLP

(57) ABSTRACT

A converter lens (RCL) has a negative refractive power, which is disposed on an image side of a master lens (ML) to make a focal length of an entire system longer than that of the master lens alone. The converter lens comprises a most image-side lens element (LT) disposed closest to an image side in the converter lens, wherein the most image-side lens element has a lens surface having a convex shape toward an image side, a lens disposed closest to an image side in the converter lens has a positive refractive power, and $mN < mP$ and $0.0 \leq LR2/AR2 < 1.0$ are satisfied.

21 Claims, 9 Drawing Sheets

(56) References Cited

U.S. PATENT DOCUMENTS

| | | |
|---|---|---|
| 2018/0045930 A1 | 2/2018 | Maetaki |
| 2018/0164558 A1 | 6/2018 | Saito |
| 2019/0041605 A1 | 2/2019 | Saito et al. |
| 2020/0103647 A1 | 4/2020 | Saito |
| 2020/0271903 A1 | 8/2020 | Ebe et al. |
| 2020/0271904 A1 | 8/2020 | Saito et al. |
| 2020/0310088 A1 | 10/2020 | Saito |
| 2020/0319435 A1 | 10/2020 | Ichimura |

FOREIGN PATENT DOCUMENTS

| | | |
|---|---|---|
| CN | 105988188 A | 10/2016 |
| CN | 106873125 A | 6/2017 |
| CN | 109073868 A | 12/2018 |
| CN | 111624749 A | 9/2020 |
| CN | 111624835 A | 9/2020 |
| CN | 111796392 A | 10/2020 |
| JP | 2018-25676 A | 2/2018 |
| WO | 2017/134928 A1 | 8/2017 |

* cited by examiner

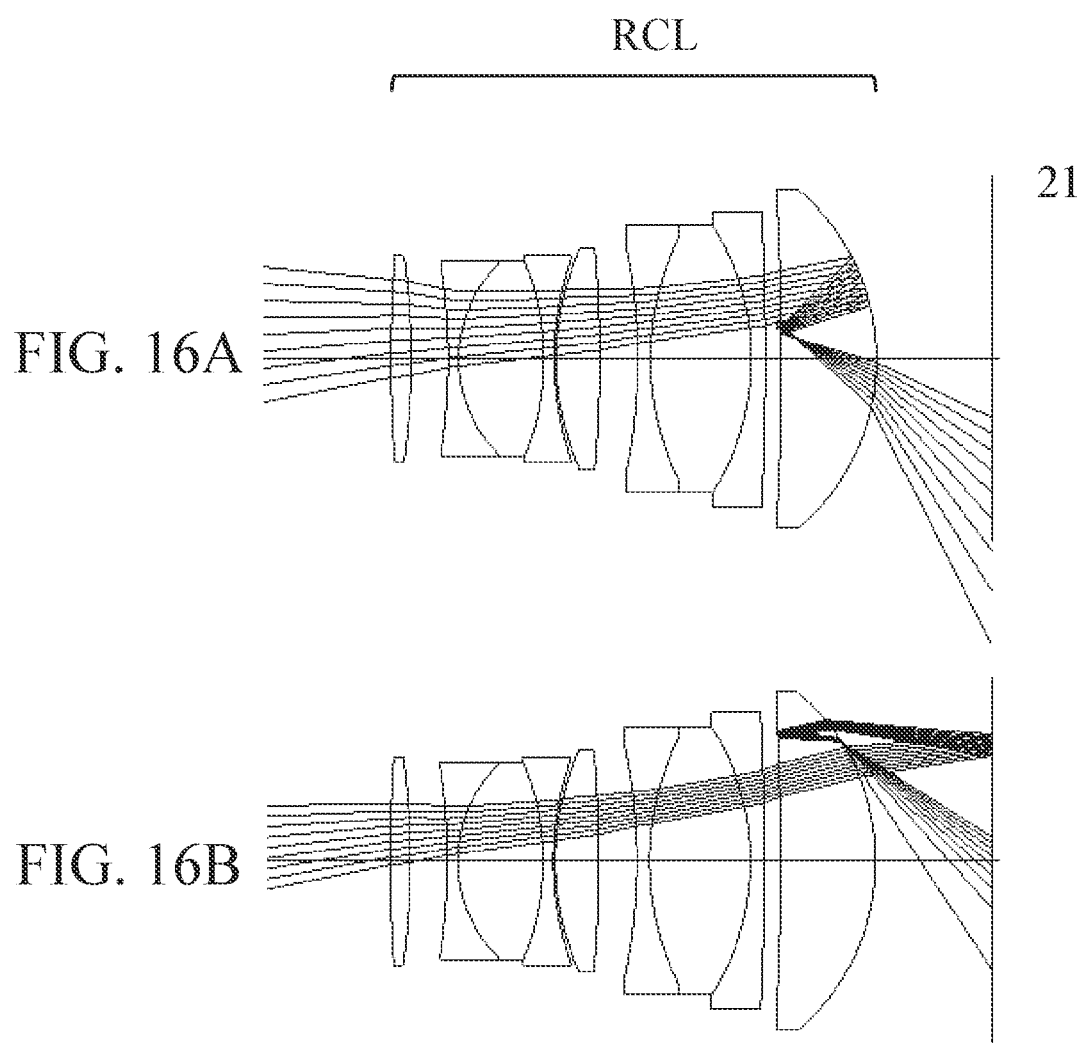

CONVERTER LENS, INTERCHANGEABLE LENS, AND IMAGE-CAPTURING APPARATUS

BACKGROUND OF THE INVENTION

Field of the Invention

The present invention relates to a converter lens, an interchangeable lens, and an image-capturing apparatus.

Description of the Related Art

A rear converter lens that can extend a focal length of an entire lens system by being placed between an image-capturing apparatus and an interchangeable lens including a master lens is known.

In a case of the rear converter lens, there is an advantage that the entire lens system can be compactified as compared with a case where it is disposed on an object side of the master lens. However, a residual aberration of the master lens is magnified in proportion to an enlarging magnification, so that image quality is likely to deteriorate. Therefore, it is necessary to properly correct various aberrations of the rear converter lens itself in order to properly maintain various aberrations of the entire lens system even when the rear converter lens is disposed on an image side of the master lens.

International Publication No. WO 2017/134928 discloses a rear converter lens that can be used with a master lens having a relatively short back focus.

The rear converter lens that makes a focal length of the entire lens system long has a negative refractive power. That is, in the rear converter lens, Petzval sum having a large negative component is likely to occur. Therefore, when it is disposed on an image side of the master lens, a field curvature is likely to be particularly large. In addition, an aperture stop is not disposed in the rear converter lens, and the aperture stop included in the master lens is often used instead. Therefore, in the rear converter lens, a principal ray of an off-axis light rays passes through a position radially separated from an optical axis without intersecting the optical axis. This also causes a large field curvature.

Further, especially when the back focus of the master lens is short, a lens diameter of the rear converter lens disposed on the image side of the master lens tends to be large, and it is difficult to secure a space for arranging many lenses. Further, since the back focus is short, it is important to suppress an image-forming property of stray light due to reflection on a light-receiving element (image sensor) for photoelectric conversion, an LPF (low pass filter), an infra-red cut filter, and a converter lens which are disposed near the light-receiving element.

Therefore, it is difficult to configure the converter lens in a small size, suppress the stray light, and correct field curvature and lateral chromatic aberration. It is possible to achieve size reduction by using an aspherical lens as in WO 2017/134928, but further improvement in lateral chromatic aberration may be desired.

SUMMARY OF THE INVENTION

The present invention provides a converter lens that suppresses the stray light when disposed on an image side of a master lens and has high optical performance.

A converter lens as one aspect of the present invention has a negative refractive power, which is disposed on an image side of a master lens to make a focal length of an entire system longer than a focal length of the master lens alone. The converter lens includes a most image-side lens element disposed closest to an image side in the converter lens, wherein the most image-side lens element has a lens surface having a convex shape toward an image side, wherein a lens disposed closest to an image side in the converter lens has a positive refractive power, and wherein the following conditional expressions are satisfied: $mN<mP$ and $0.0 \leq LR2/AR2 \, 1.0$, where $mP$ is the number of positive lens components of the converter lens, $mN$ is the number of negative lens components of the converter lens, $LR2$ is a radius of curvature of an image-side lens surface of the most image-side lens element, and $AR2$ is a radius of curvature of an object-side lens surface of the most image-side lens element.

An interchangeable lens as another aspect of the present invention includes a master lens and a converter lens having a negative refractive power, which is disposed on an image side of the master lens to make a focal length of an entire system longer than a focal length of the master lens alone. The converter lens includes a most image-side lens element disposed closest to an image side in the converter lens, wherein the most image-side lens element has a lens surface having a convex shape toward an image side, wherein a lens disposed closest to an image side in the converter lens has a positive refractive power, and wherein the following conditional expressions are satisfied: $mN<mP$ and $0.0 \leq LR2/AR2<1.0$, where $mP$ is the number of positive lens components of the converter lens, $mN$ is the number of negative lens components of the converter lens, $LR2$ is a radius of curvature of an image-side lens surface of the most image-side lens element, and $AR2$ is a radius of curvature of an object-side lens surface of the most image-side lens element.

An image-capturing apparatus as another aspect of the present invention includes a master lens, a converter lens having a negative refractive power, which is disposed on an image side of the master lens to make a focal length of an entire system longer than a focal length of the master lens alone, and an image sensor configured to receive an image formed by the converter lens. The converter lens includes a most image-side lens element disposed closest to an image side in the converter lens, wherein the most image-side lens element has a lens surface having a convex shape toward an image side, wherein a lens disposed closest to an image side in the converter lens has a positive refractive power, and wherein the following conditional expressions are satisfied: $mN<mP$ and $0.0 \leq LR2/AR2<1.0$, where $mP$ is the number of positive lens components of the converter lens, $mN$ is the number of negative lens components of the converter lens, $LR2$ is a radius of curvature of an image-side lens surface of the most image-side lens element, and $AR2$ is a radius of curvature of an object-side lens surface of the most image-side lens element.

Further features of the present invention will become apparent from the following description of exemplary embodiments with reference to the attached drawings.

BRIEF DESCRIPTION OF THE DRAWINGS

FIGS. 16A and 16B is a diagram illustrating an image-forming property of stray light with respect to a converter lens.

DESCRIPTION OF THE EMBODIMENTS

Hereinafter, a rear converter lens (hereinafter referred to as a converter lens) and an image-capturing apparatus according to embodiments of the present invention will be described in detail with reference to the accompanying drawings.

Figure 1:
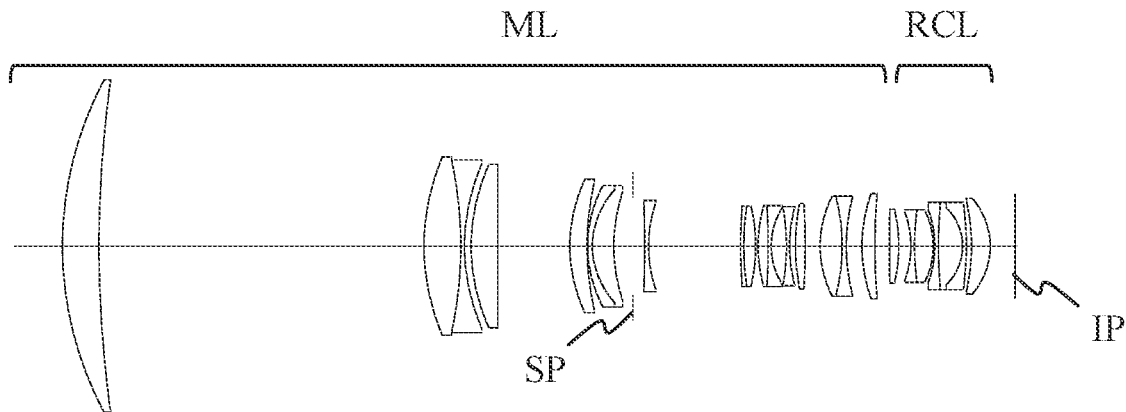
FIG. 1 is a sectional view of a master lens and a converter lens.

As illustrated in FIG. 1, the converter lens RCL of the embodiments of the present invention is disposed on an image side of a master lens ML (main lens system) such as an interchangeable lens. Therefore, a focal length of an image-capturing optical system (entire system) including the master lens ML and the converter lens RCL becomes longer than that when only the master lens ML is used as the image-capturing optical system. Further, when the master lens ML is put in a protective member such as an underwater housing and used underwater, the present invention can be applied to correct a field curvature.

The master lens ML is an image-capturing lens system used in an image-capturing apparatus such as a digital video camera, a digital camera, a silver salt film camera, a TV camera.

In a sectional view of the master lens ML illustrated in FIG. 1 and sectional views of the converter lenses RCL illustrated in FIGS. 3, 5, 7, 9, 11, and 13, a left side is an object side (front) and a right side is an image side (backward). An aperture stop SP determines (limits) a light flux of an open F number (Fno).

When the image-capturing apparatus is the digital video camera, the digital camera, or the like, an image plane IP corresponds to an image-capturing plane of an image sensor (photoelectric conversion element) such as a CCD sensor or a CMOS sensor. When the image-capturing apparatus is the silver salt film camera, the image plane IP corresponds to a film plane.

Figure 2:
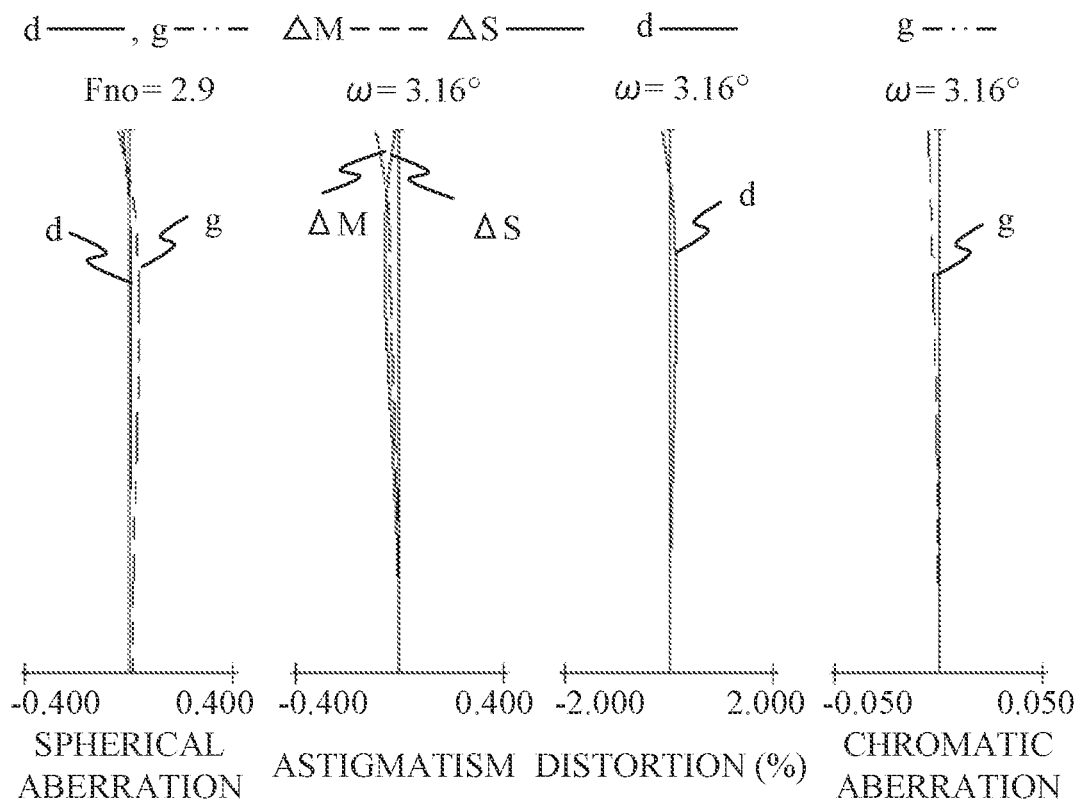
FIG. 2 is an aberration diagram of the master lens when focused on an object at infinity.

FIG. 2 is an aberration diagram of the master lens ML, and FIGS. 4, 6, 8, 10, 12, and 14 are aberration diagrams when the converter lens RCL according to each embodiment described later is attached to the master lens ML. In a spherical aberration diagram, a solid line indicates a d line and a chain double-dashed line indicates a g line. In an astigmatism diagram, a broken line ΔM indicates an aberration amount on a meridional image plane, and a solid line ΔS indicates an aberration amount on a sagittal image plane. A distortion aberration is illustrated for the d line. A lateral chromatic aberration is illustrated for the g line. ω is a half angle of view (degree), which is a field angle calculated by paraxial calculation. Frio is an F number.

The converter lens RCL according to the embodiments has a negative refractive power and is disposed on the image side of the master lens ML to make a focal length of the entire system longer than that of the master lens alone. Making the focal length longer means that the following conditional expression is satisfied:

$$1.05 < \beta R$$

where βR is a magnification of the converter lens RCL.

Further, in a lens element LT (the most image-side lens element) disposed closest to the image side in the converter lens RCL, LR2 indicates a radius of curvature of an image-side lens surface of the lens element LT, and AR2 indicates a radius of curvature of an object-side lens surface of the lens element LT. Here, the lens element refers to an element composed of one lens or a cemented lens of a plurality of lenses. When a lens surface is an aspherical surface, a radius of curvature means a base radius of curvature (paraxial radius of curvature).

When a lens surface is an aspherical surface, for example, an aspherical shape is expressed as:

$$x = (h^2/R)/[1+\{1-(1+k)(h/R)^2\}^{1/2}] + A4h^4 + A6h^6 + A8h^8 + A10h^{10} + A12h^{12},$$

where k is an eccentricity, A4, A6, A8, A10, and A12 are aspherical coefficients, x is a displacement in an optical axis direction at a position of a height h from an optical axis with reference to a lens surface vertex, and R is a paraxial radius of curvature. A radius of curvature component of this expression is R.

The lens element LT disposed closest to the image side in the converter lens RCL is configured to have a convex shape on the image side.

When a back focus of the master lens ML is short, a lens diameter of the converter lens RCL disposed on the image side of the master lens tends to be large. Further, since a ray height of an on-axis ray is low and it is difficult to secure an effect of correcting various aberrations, a refractive surface having the convex shape on the image side is arranged so as not to generate aberration for off-axis rays. Further, in order to suppress a Petzval sum, it is necessary to dispose a lens having a strong positive refractive power. The positive lens has no choice but to have a small radius of curvature, and in order to be compatible with correction of field curvature, distortion aberration, and lateral chromatic aberration, preferably the positive lens is disposed closest to the image side and has a strong convex shape on the image side.

The converter lens RCL satisfies the following conditional expressions (1) and (2):

$$mN<mP \tag{1}$$

$$0.0 \leq LR2/AR2 < 1.0 \tag{2}$$

where mP is the number of positive lens components of the converter lens RCL, mN is the number of negative lens components of the converter lens RCL, and LR2 and AR2 are the radius of curvature of the image-side lens surface and the radius of curvature of the object-side lens surface of the lens element LT disposed closest to the image side in the converter lens RCL, respectively.

The conditional expression (1) is a condition for properly setting a lens configuration of the converter lens RCL, suppressing the Petzval sum, properly correcting an image plane characteristic, and ensuring the degree of freedom in selecting a lens material. Since the converter lens RCL has a negative refractive power, the fact that the number of positive lens components is larger than the number of negative lens components means that at least two positive lenses are provided. In the converter lens RCL having the negative refractive power, it is necessary to optimize a refractive power of the positive lens components and appropriately set the lens material thereof in order to achieve both shortening of the total length and correction of field curvature and lateral chromatic aberration. Therefore, it is important to satisfy the conditional expression (1).

The conditional expression (2) is an expression in which the radius of curvature LR2 of the image-side lens surface of the lens element LT is defined by the radius of curvature AR2 of the object-side lens surface.

If the radius of curvature of the object-side lens surface becomes smaller than the radius of curvature of the image-side lens surface beyond the upper limit of conditional expression (2), it is advantageous for correction of the lateral chromatic aberration. However, it becomes difficult to secure a positive refractive power, and it becomes difficult to secure a back focus with respect to a magnification of the converter. When the lower limit value of the conditional expression (2) is exceeded and the image-side surface of the lens element LT has a convex shape on the image side, this is not preferable because the image-forming properly of stray light due to reflection on the image sensor, the LPF, the infrared cut filter disposed near the light-receiving element or the converter lens is enhanced (See FIGS. 16A and 16B).

As described above, according to the present invention, it is possible to obtain the converter lens RCL that suppresses stray light and has high optical performance. The converter lens RCL can be compactified depending on the focal length of the converter lens RCL. In particular, the converter lens RCL of the present invention is suitable for a converter apparatus that is disposed between a mirrorless camera and an interchangeable lens that is detachably attachable to the camera and has a relatively short back focus.

Moreover, it is preferable that a numerical range of the conditional expression (2) is as follows.

$$0.05 < LR2/AR2 < 0.8 \tag{2a}$$

Further, it is more preferable that a numerical range of the conditional expression (2) is as follows.

$$0.08 < LR2/AR2 < 0.7 \tag{2b}$$

Furthermore, it is preferable that the converter lens RCL satisfies one or more of the following conditional expressions (3) to (11).

$$1.58 < nAP < 1.80 \tag{3}$$

$$1.80 < nAN < 2.20 \tag{4}$$

$$0.0 \leq LR2/AR1 < 0.9 \tag{5}$$

$$0.05 < |fLP/f| < 0.60 \tag{6}$$

$$1.45 < nLP < 1.75 \tag{7}$$

$$0.0 \leq LR2/BR2 < 1.0 \tag{8}$$

$$0.4 < AR2/AR1 < 2.0 \tag{9}$$

$$-7.0 < SFL < -1.0 \tag{10}$$

$$0.1 < |f1/f| < 0.9 \tag{11}$$

Here, nAP is an average refractive index at the d line of materials of all the positive lenses included in the converter lens RCL when the converter lens RCL has at least two positive lenses. nAN is an average refractive index at the d line of materials of all the negative lenses included in the converter lens RCL when the converter lens RCL has at least one negative lens. f is a focal length of the converter lens RCL, and f1 is a focal length of a first lens element L1 (the most object-side lens element) disposed closest to the object side in the converter lens RCL. AR1 and BR2 are a radius of curvature of an image-side lens surface and a radius of curvature of an object-side lens surface of a lens element LS (the most image-side adjacent lens element) adjacent to the object side of the lens element LT, respectively. fLP is a focal length of a positive lens disposed closest to the image side of all the positive lenses included in the converter lens RCL, which has at least two positive lenses, and nLP is a refractive index of a material of the positive lens at the d line. SFL is a shape factor of the lens element LT and is defined as the following expression:

$$SFL=(LR2 AR2)/(LR2 AR2).$$

The conditional expression (3) defines the average refractive index of the materials of all the positive lenses included in the converter lens RCL. By satisfying the conditional expression (3), in particular, axial chromatic aberration and field curvature can be satisfactorily corrected.

If the upper limit of the conditional expression (3) is exceeded and the average refractive index becomes high, an absolute value of the Petzval sum increases and the field curvature increases, which is not preferable. Alternatively, if the number of lenses is increased in order to correct this field curvature, it is difficult to downsize the converter lens RCL, which is not preferable. If the lower limit of the conditional expression (3) is exceeded, the average refractive index becomes low, and an Abbe number of the materials becomes large, it becomes difficult to correct the axial chromatic aberration, which is not preferable.

The conditional expression (4) defines the average refractive index of the materials of all the negative lenses included in the converter lens RCL. By satisfying the conditional expression (4), particularly the lateral chromatic aberration and the field curvature can be satisfactorily corrected.

Generally, the Abbe number tends to decrease as the refractive index of a material of a negative lens increases. Therefore, if the upper limit of the conditional expression (4) is exceeded, the average refractive index becomes high, and the Abbe number becomes small, insufficient correction of the primary chromatic aberration is caused, and it becomes difficult to correct the lateral chromatic aberration, which is not preferable. If the lower limit of the conditional expression (4) is exceeded, and the average refractive index becomes low, a negative component of the Petzval sum becomes large and the field curvature increases, which is not preferable. Alternatively, if the number of lenses is increased in order to correct this field curvature, it is difficult to downsize the converter lens RCL, which is not preferable.

The conditional expression (5) defines the radius of curvature LR2 of the image-side lens surface of the lens element LT of the converter lens RCL by the radius of curvature AR1 of the object-side lens surface of the lens element LS adjacent to the object side of the lens element LT disposed closest to the image side.

If the upper limit of the conditional expression (5) is exceeded, and the radius of curvature AR1 becomes small, it is advantageous for suppressing the stray light, but it is difficult to correct the field curvature, and it is difficult to be compatible with the correction of the lateral chromatic aberration especially on a short wavelength side. If the lower limit of the conditional expression (5) is exceeded, and the radius of curvature LR2 becomes small, it is advantageous for correcting the distortion aberration and the field curvature, but an open angle (a relationship between an effective diameter and a radius of curvature) of the lens LT disposed closest to the image side becomes large, and variations due to manufacturing errors increase, which is not preferable.

The conditional expression (6) defines the focal length of the positive lens disposed closest to the image side among all the positive lenses included in the converter lens RCL having at least two positive lenses by the focal length of the converter lens RCL. By satisfying the conditional expression (6), it is possible to achieve both downsizing of the converter lens RCL and reduction of the field curvature and the lateral chromatic aberration.

If the upper limit of the conditional expression (6) is exceeded and the refractive power of the positive lens becomes small, coma aberration at a periphery of a screen, particularly a flare component of an upper line, is insufficiently corrected, which is not preferable. If the lower limit of the conditional expression (6) is exceeded and the refractive power of the positive lens becomes large, it becomes difficult to correct the distortion aberration and the lateral chromatic aberration.

The conditional expression (7) defines the refractive index, at the d line, of the material of the positive lens disposed closest to the image side among all the positive lenses included in the converter lens RCL having at least two positive lenses. By satisfying the conditional expression (7), it is possible to both downsize the converter lens RCL and reduce various aberrations.

If the upper limit of the conditional expression (7) is exceeded and the refractive index of the material of the positive lens Lp becomes high, insufficient correction of the field curvature is caused, which is not preferable. If the lower limit of the conditional expression (7) is exceeded and the refractive index of the material of the positive lens Lp becomes low, high-order distortion aberration occurs, which is not preferable.

The conditional expression (8) defines the radius of curvature LR2 of the image-side lens surface of the lens element LT of the converter lens RCL by the radius of curvature BR2 of the object-side lens surface of the lens element LS.

If the upper limit of the conditional expression (8) is exceeded and the radius of curvature of the object-side lens surface of the lens element LS becomes small, it is advantageous for correcting an off-axis coma aberration, but it becomes difficult to secure a positive refractive power, which is not preferable. If the lower limit of the conditional expression (8) is exceeded and the radius of curvature of the object-side lens surface of the lens element LS becomes large, insufficient correction of the spherical aberration is caused.

The conditional expression (9) defines the radius of curvature AR2 of the object-side lens surface of the lens element LT of the converter lens RCL by the radius of curvature AR1 of the image-side lens surface of the lens element LS.

If the upper limit of the conditional expression (9) is exceeded and the radius of curvature of the object-side lens surface of the lens element LS becomes small, it is advantageous for correction of the off-axis coma aberration, but it becomes difficult to secure a positive refractive power, which is not preferable. If the lower limit of the conditional expression (9) is exceeded and the radius of curvature of the object-side lens surface of the lens element LS becomes large, insufficient correction of the spherical aberration is caused.

The conditional expression (10) defines the shape factor SFL of the lens element LT disposed closest to the image side in the converter lens RCL. In order to suppress occurrence of various aberrations caused by the off-axis rays incident on the image plane, it is preferable that each off-axis ray is made incident on the lens element closest to the image side in the converter lens RCL so as to maintain concentricity with respect to an exit pupil and is emitted. Therefore, it is important that the lens element LT disposed closest to the image side has a convex shape on the image side as a whole and that shape is appropriately set.

If the upper limit of the conditional expression (10) is exceeded and the image-side convex shape becomes weak (piano-convex shape), insufficient correction of the field curvature and the distortion aberration is caused, which is not preferable. If the lower limit of the conditional expression (10) is exceeded and the image-side convex shape becomes strong, it is advantageous from a viewpoint of aberration correction, but it causes an increase in a half-open angle of a lens surface and processing such as polishing and coating becomes difficult, which is not preferable.

The conditional expression (11) defines the focal length fl of the first lens element L1 by the focal length f of the converter lens RCL. By satisfying the conditional expression (11), the refractive power of the first lens element L1 is strengthened to downsize the converter lens RCL, and the negative refractive power of the converter lens RCL is weakened to satisfactorily correct the field curvature.

If the upper limit of the conditional expression (11) is exceeded, the focal length fl of the first lens element L1 becomes long (the absolute value of the focal length becomes large), and the refractive power of the first lens element L1 becomes weak, the negative refractive power of the entire converter lens RCL becomes too strong. This increases the Petzval sum in a negative direction and makes it difficult to correct the field curvature, which is not preferable. If the lower limit of the conditional expression (11) is exceeded, the focal length fl of the first lens element L1 becomes short (the absolute value of the focal length becomes small). As a result, the refractive power of the first lens element L1 becomes strong, and it becomes difficult to correct the axial chromatic aberration generated in the first lens element L1 with lenses disposed on the image side of the first lens element L1, which is not preferable. Alternatively, the number of lenses is increased to correct the axial chromatic aberration, which makes it difficult to downsize the converter lens RCL, which is not preferable.

The numerical ranges of the conditional expressions (3) to (11) are preferably set as follows.

$$1.60 < nAP < 1.75 \quad (3a)$$

$$1.83 < nAN < 2.00 \quad (4a)$$

$$0.05 < LR2/AR < 0.80 \quad (5a)$$

$$0.15 < |fLP/f| < 0.55 \quad (6a)$$

$$1.50 < nLP < 1.69 \quad (7a)$$

$$0.1 < LR2/BR2 < 0.9 \quad (8a)$$

$$0.55 < AR2/AR1 < 1.80 \quad (9a)$$

$$-6.0 < SFL < -1.1 \quad (10a)$$

$$0.2 < |ft/f| < 0.8 \quad (11a)$$

More preferably, the numerical ranges of the conditional expressions (3) to (11) are set as follows.

$$1.62 < nAP < 1.73 \quad (3b)$$

$$1.85 < nAN < 1.95 \quad (4b)$$

$$0.07 < LR2/AR1 < 0.70 \quad (5b)$$

$$0.25 < |fLP/f| < 0.51 \quad (6b)$$

$$1.51 < nLP < 1.68 \quad (7b)$$

$$0.17 < LR2/BR2 < 0.80 \quad (8b)$$

$$0.65 < AR2/AR1 < 1.50 \quad (9b)$$

$$-5.6 < SFL < -1.15 \quad (10b)$$

$$0.30 < |ft/f| < 0.72 \quad (11b)$$

By satisfying at least one of the above conditional expressions, it is possible to obtain high optical performance by satisfactorily correcting various aberrations such as field curvature and lateral chromatic aberration. Furthermore, it is possible to downsize the converter lens RCL.

Further, a preferable configuration of the converter lens RCL will be described.

As in the first to sixth embodiments described later, the converter lens RCL preferably has a cemented lens in which a negative lens, a positive lens, and a negative lens are cemented, which are arranged from the object side to the image side. Thereby, the Petzval sum can be brought close to zero and the field curvature can be corrected satisfactorily.

It is preferable that a most object-side lens surface of a second lens element L2 (most object-side adjacent lens element) adjacent to the image side of the first lens element L1 is concave toward the object side. Further, it is preferable that a most image-side lens surface of the second lens element L2 is concave toward the image side. This can reduce occurrence of astigmatism.

The lens element LT (one cemented lens in which a plurality of lenses are cemented or one lens) disposed closest to the image side in the converter lens RCL preferably has a positive refractive power. This facilitates correction of the field curvature.

Further, it is preferable that all the lenses forming the converter lens RCL are spherical lenses. By not using an aspherical lens, the converter lens RCL can be manufactured at low cost.

Next, the master lens ML of the embodiments and the converter lens RCL of the embodiments will be described.

Master Lens

A configuration of the master lens ML is common to the first to sixth embodiments of the converter lens RCL.

FIG. 1 is a sectional view of the master lens ML when focused on an object at infinity, and FIG. 2 is an aberration diagram of the master lens ML when focused on an object at infinity. The master lens ML has an F number of 2.90, a half angle of view of 3.16 degrees, and a back focus of 39 mm. Note that the configuration of the master lens ML given in the embodiments is an example, and any other optical system may be used as long as it is an optical system capable of forming an image on the image plane IP.

Converter Lens

Next, the converter lenses according to the first to sixth embodiments will be described.

First Embodiment

Figure 3:
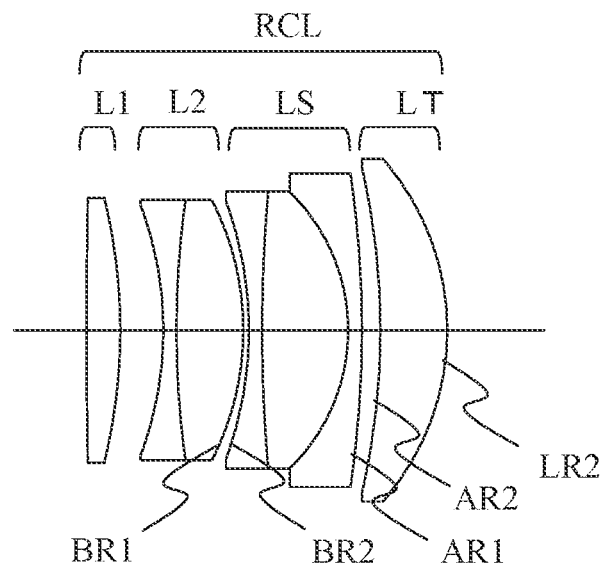
FIG. 3 is a sectional view of a converter lens according to the first embodiment.
Figure 4:
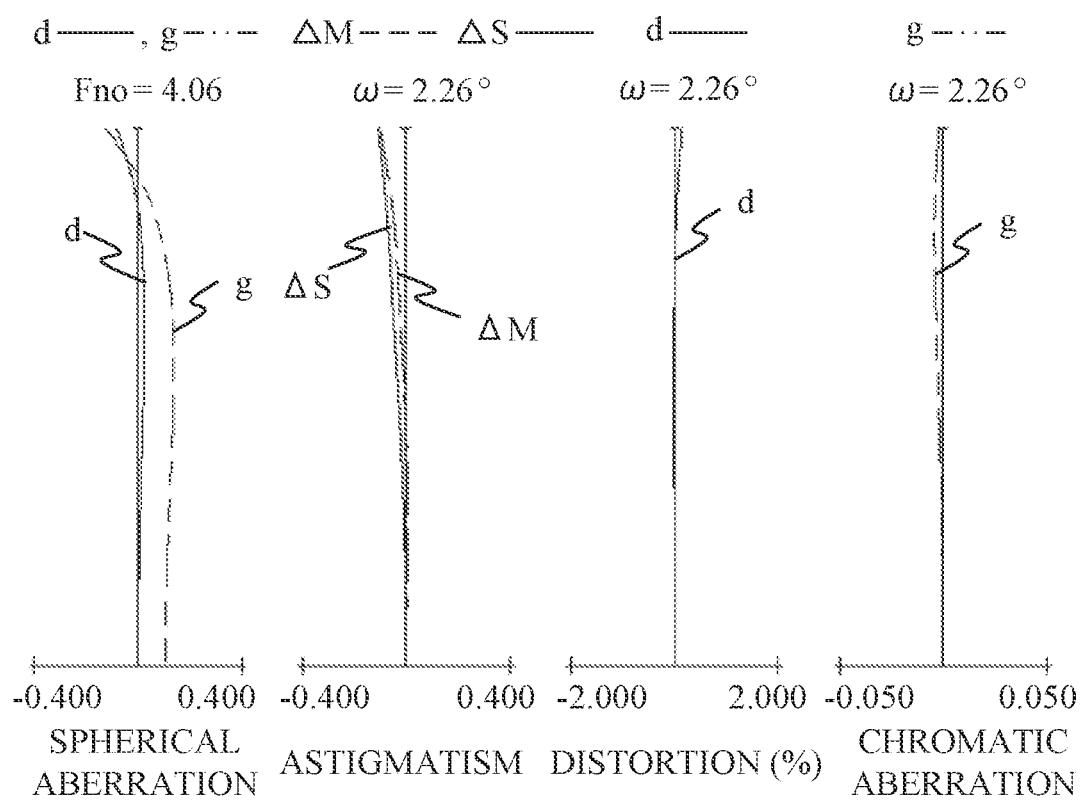
FIG. 4 is an aberration diagram of the converter lens according to the first embodiment when focused on an object at infinity when disposed on an image side of the master lens.

FIG. 3 is a sectional view of the converter lens RCL according to the first embodiment. FIG. 4 is an aberration diagram of the converter lens RCL according to the first embodiment when focused on an object at infinity when disposed on an image side of the master lens ML.

In the converter lens RCL according to the first embodiment, the first lens element L1 is a positive single lens disposed closest to the object side in the converter lens RCL. The second lens element L2 is a cemented lens in which two lenses of a negative lens and a positive lens are cemented in order from the object side to the image side. The lens element LT is a positive single lens disposed closest to the image side in the converter lens RCL, and the lens element LS is a cemented lens in which three lenses of a negative lens, a positive lens, and a negative lens are cemented in order from the object side.

Second Embodiment

Figure 5:
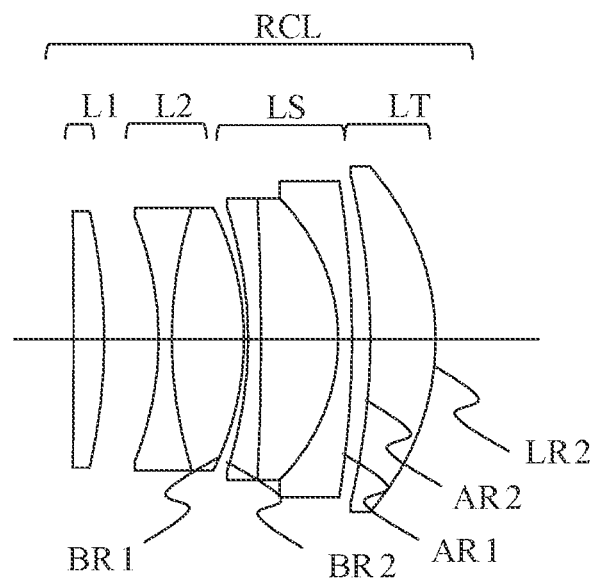
FIG. 5 is a sectional view of a converter lens according to the second embodiment.
Figure 6:
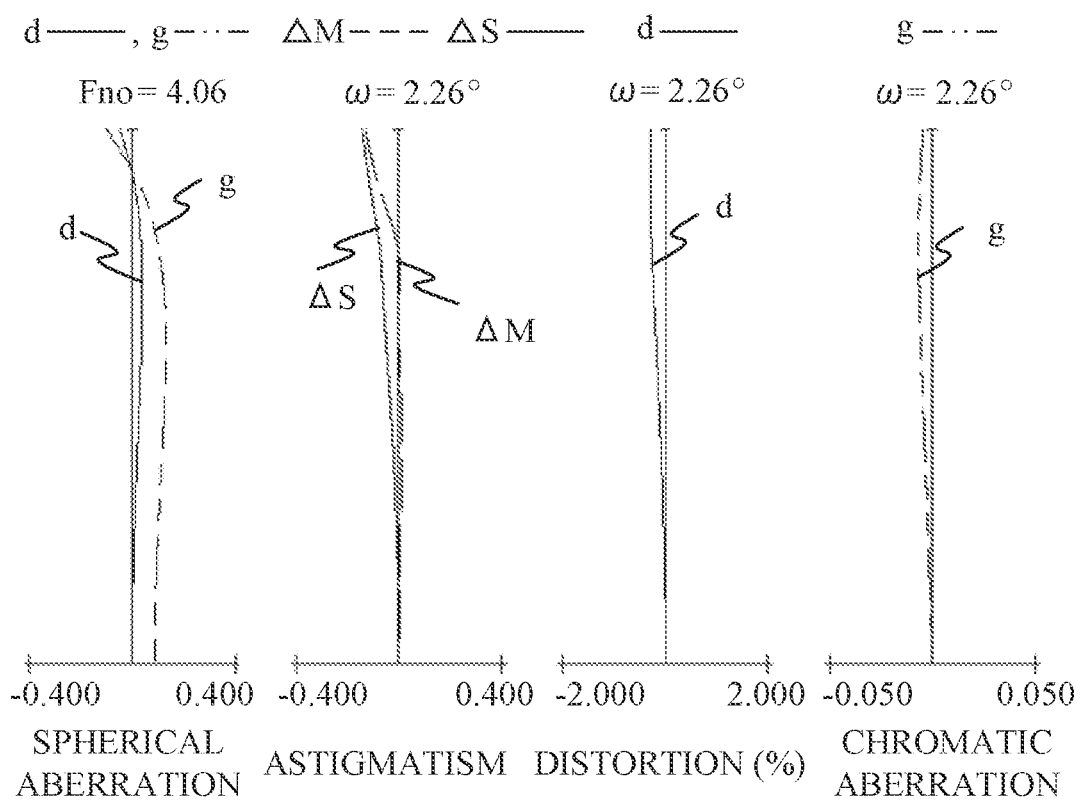
FIG. 6 is an aberration diagram of the converter lens according to the second embodiment when focused on an object at infinity when disposed on an image side of the master lens.

FIG. 5 is a sectional view of the converter lens RCL according to the second embodiment. FIG. 6 is an aberration diagram of the converter lens RCL according to the second embodiment when focused on an object at infinity when disposed on an image side of the master lens ML.

In the converter lens RCL according to the second embodiment, the first lens element L1 is a positive single lens disposed closest to the object side in the converter lens RCL. The second lens element L2 is a cemented lens in which two lenses of a negative lens and a positive lens are cemented in order from the object side to the image side. The lens element LT is a positive single lens disposed closest to the image side in the converter lens RCL, and the lens element LS is a cemented lens in which three lenses of a negative lens, a positive lens, and a negative lens are cemented in order from the object side.

Third Embodiment

Figure 7:
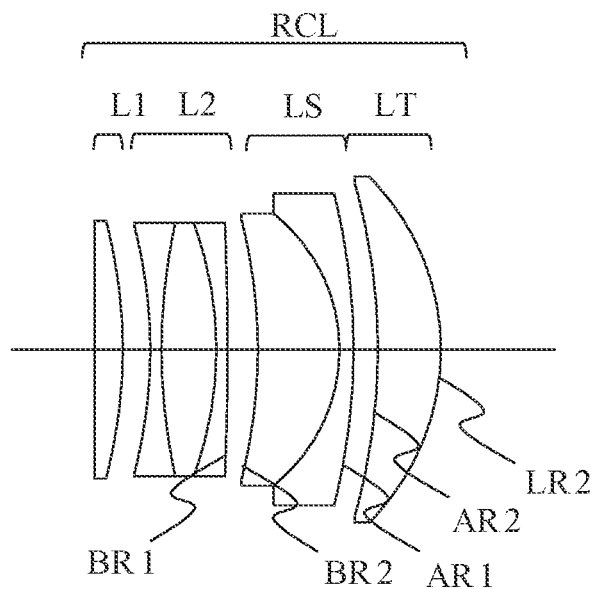
FIG. 7 is a sectional view of a converter lens according to the third embodiment.
Figure 8:
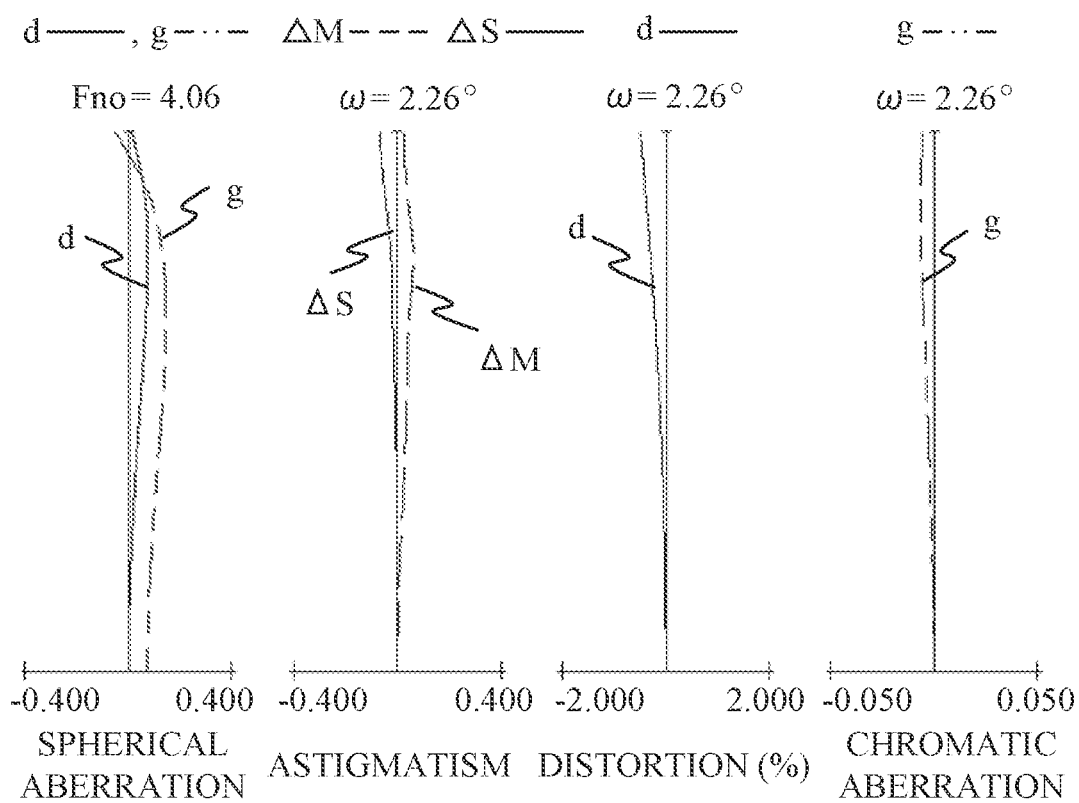
FIG. 8 is an aberration diagram of the converter lens according to the third embodiment when focused on an object at infinity when disposed on an image side of the master lens.

FIG. 7 is a sectional view of the converter lens RCL according to the third embodiment. FIG. 8 is an aberration diagram of the converter lens RCL according to the third embodiment when focused on an object at infinity when disposed on an image side of the master lens ML.

In the converter lens RCL according to the third embodiment, the first lens element L1 is a positive single lens disposed closest to the object side in the converter lens RCL. The second lens element L2 is a cemented lens in which three lenses of a negative lens, a positive lens, and a negative lens are cemented in order from the object side to the image side. The lens element LT is a positive single lens disposed closest to the image side in the converter lens RCL, and the lens element LS is a cemented lens in which two lenses of a positive lens and a negative lens are cemented in order from the object side.

Fourth Embodiment

Figure 9:
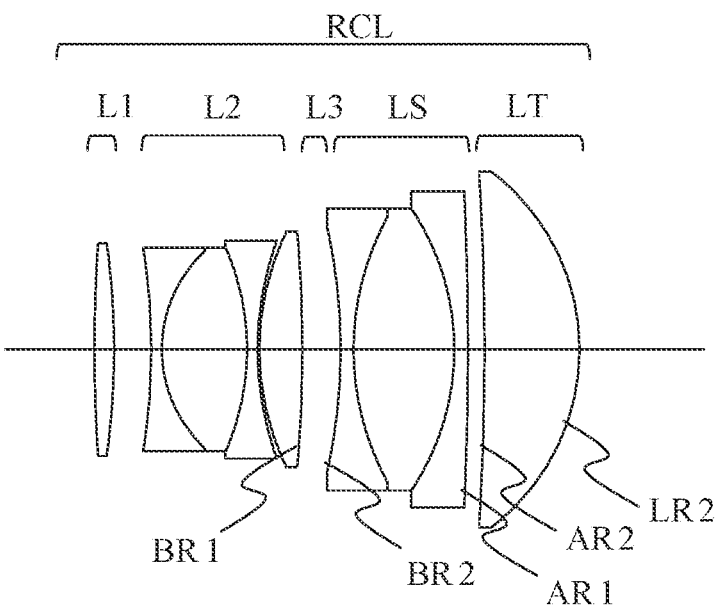
FIG. 9 is a sectional view of a converter lens according to the fourth embodiment.
Figure 10:
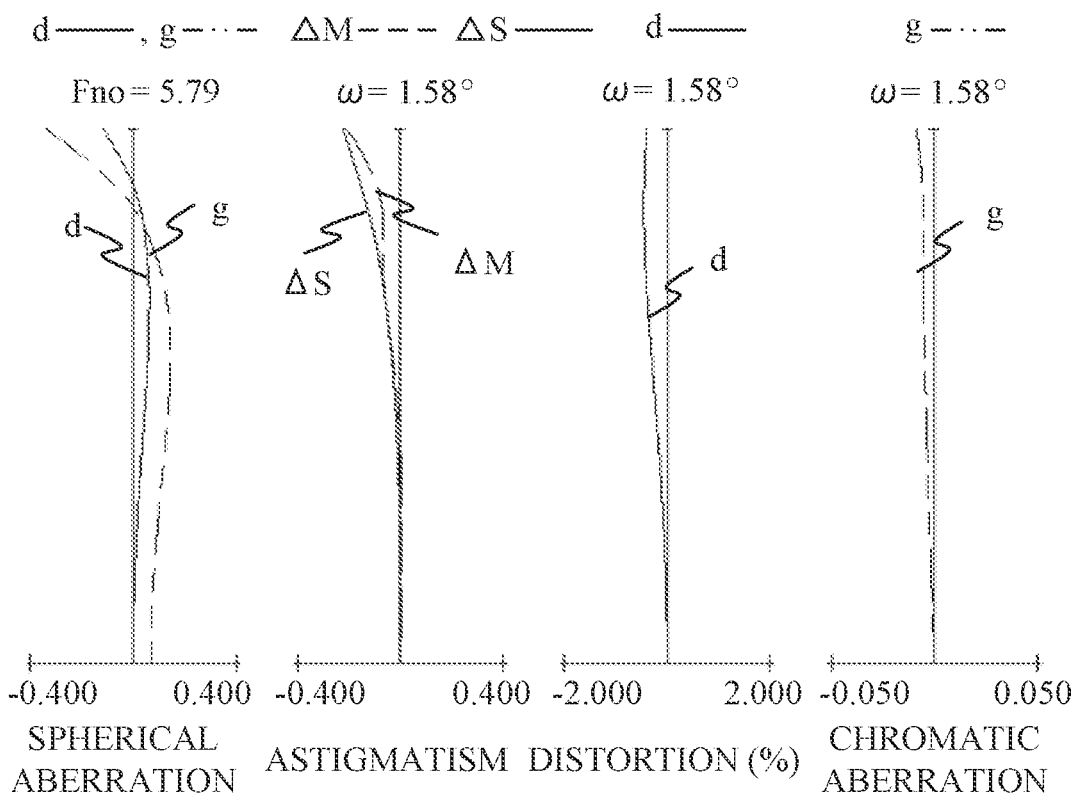
FIG. 10 is an aberration diagram of the converter lens according to the fourth embodiment when focused on an object at infinity when disposed on an image side of the master lens.

FIG. 9 is a sectional view of the converter lens RCL according to the fourth embodiment. FIG. 10 is an aberration diagram of the converter lens RCL according to the fourth embodiment when focused on an object at infinity when disposed on an image side of the master lens ML.

In the converter lens RCL according to the fourth embodiment, the first lens element L1 is a positive single lens disposed closest to the object side in the converter lens RCL. The second lens element L2 is a cemented lens in which three lenses of a negative lens, a positive lens, and a negative lens are cemented in order from the object side to the image side. A third lens element is a positive single lens. The lens element LT is a positive single lens disposed closest to the image side in the converter lens RCL, and the lens element LS is a cemented lens in which three lenses of a negative lens, a positive lens, and a negative lens are cemented in order from the object side.

Fifth Embodiment

Figure 11:
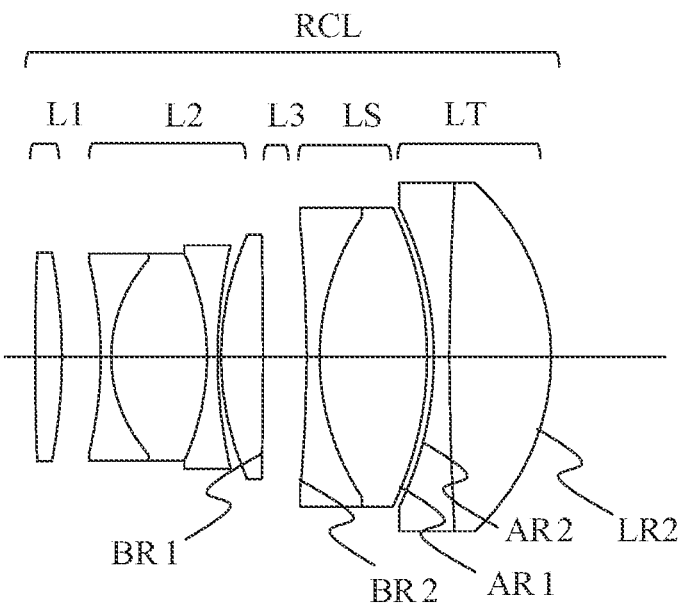
FIG. 11 is a sectional view of a converter lens according to the fifth embodiment.
Figure 12:
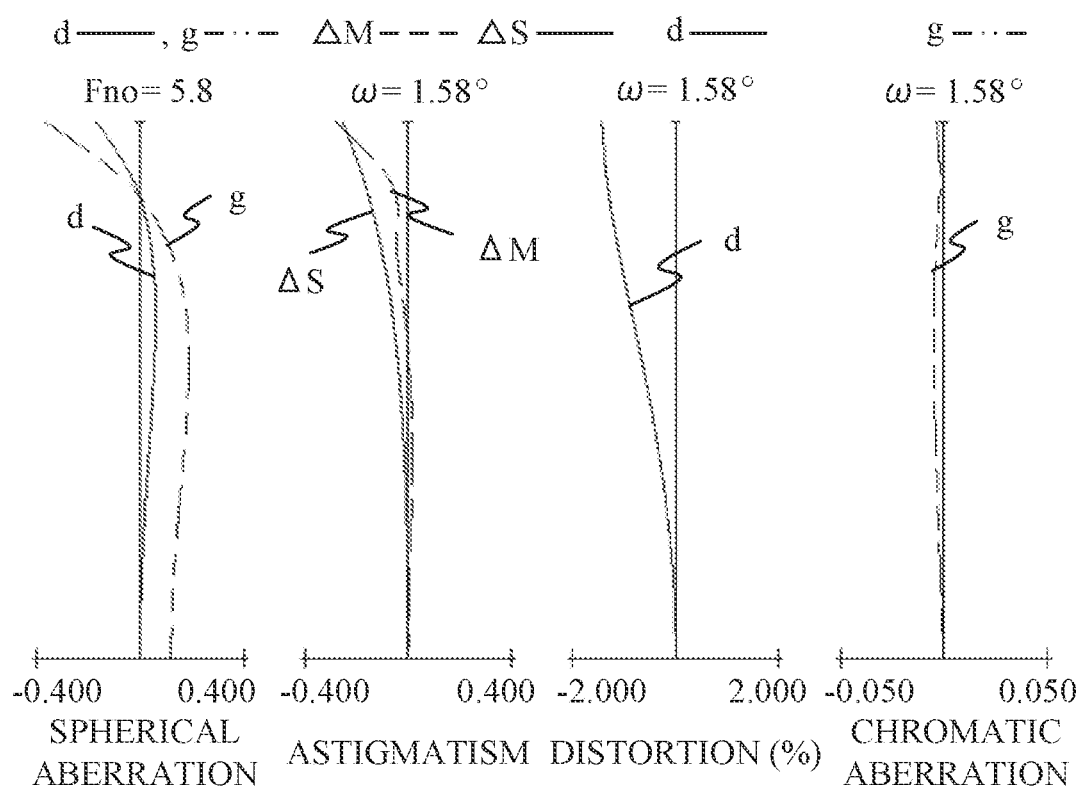
FIG. 12 is an aberration diagram of the converter lens according to the fifth embodiment when focused on an object at infinity when disposed on an image side of the master lens.

FIG. 11 is a sectional view of the converter lens RCL according to the fifth embodiment. FIG. 12 is an aberration diagram of the converter lens RCL according to the fifth embodiment when focused on an object at infinity when disposed on an image side of the master lens ML.

In the converter lens RCL according to the fifth embodiment, the first lens element L1 is a positive single lens disposed closest to the object side in the converter lens RCL. The second lens element L2 is a cemented lens in which three lenses of a negative lens, a positive lens, and a negative lens are cemented in order from the object side to the image side. A third lens element is a positive single lens. The lens element LT is disposed closest to the image side in the converter lens RCL and is a cemented lens in which two lenses of a negative lens and a positive lens are cemented in order from the object side, and the lens element LS is a cemented lens in which two lenses of a negative lens and a positive lens are cemented in order from the object side.

Sixth Embodiment

Figure 13:
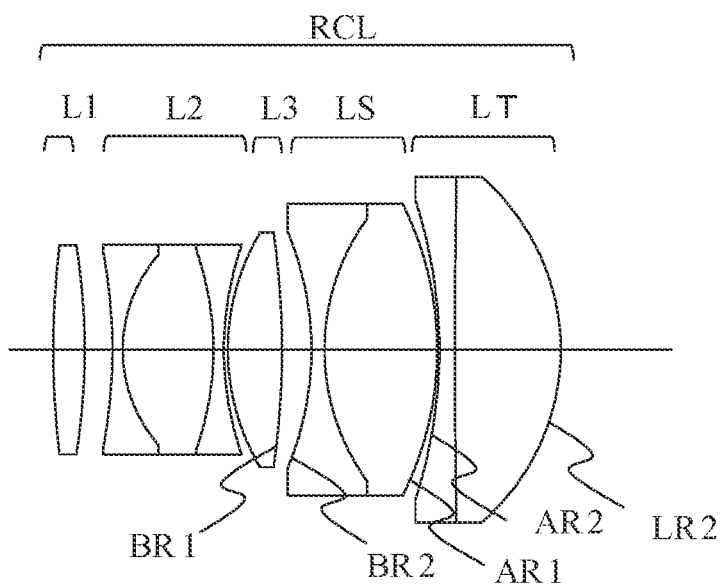
FIG. 13 is a sectional view of a converter lens according to the sixth embodiment.
Figure 14:
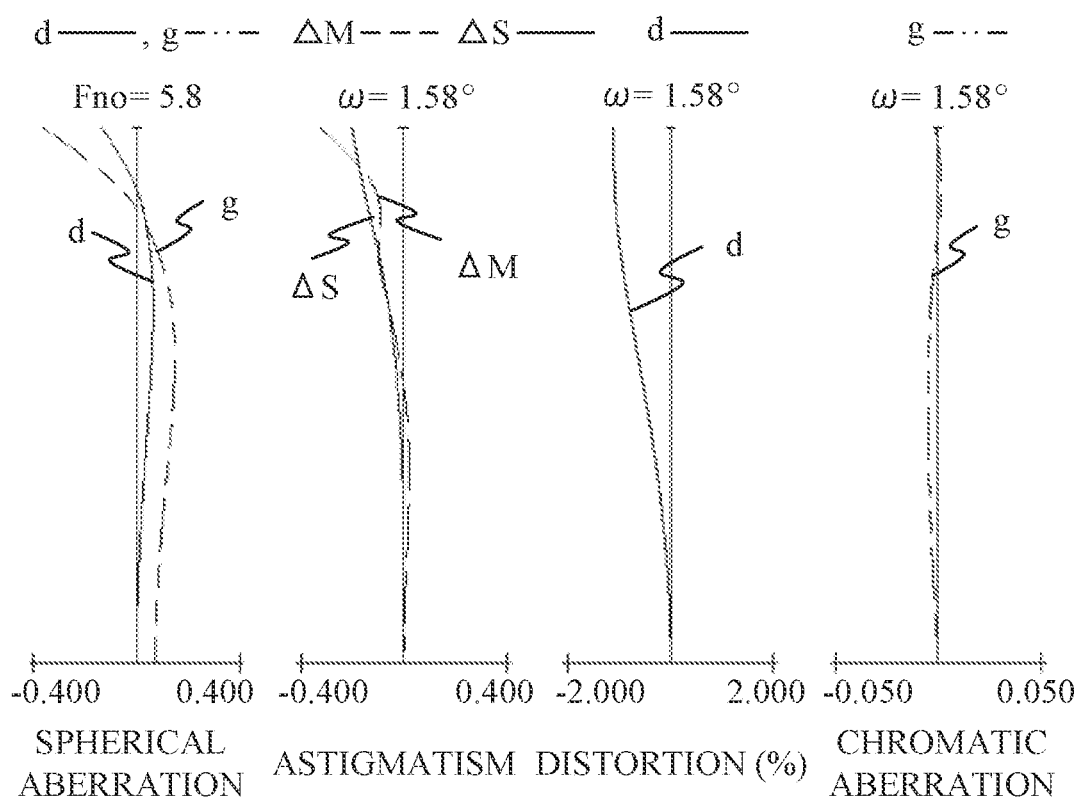
FIG. 14 is an aberration diagram of the converter lens according to the sixth embodiment when focused on an object at infinity when disposed on an image side of the master lens.

FIG. 13 is a sectional view of the converter lens RCL according to the sixth embodiment. FIG. 14 is an aberration diagram of the converter lens RCL according to the sixth embodiment when focused on an object at infinity when disposed on an image side of the master lens ML.

In the converter lens RCL according to the sixth embodiment, the first lens element L1 is a positive single lens disposed closest to the object side in the converter lens RCL. The second lens element L2 is a cemented lens in which three lenses of a negative lens, a positive lens, and a negative lens are cemented in order from the object side to the image side. A third lens element is a positive single lens. The lens element LT is disposed closest to the image side in the converter lens RCL and is a cemented lens in which two lenses of a negative lens and a positive lens are cemented in order from the object side, and the lens element LS is a cemented lens in which two lenses of a negative lens and a positive lens are cemented in order from the object side.

By satisfying the above conditional expressions (1) to (11) in all of the first to sixth embodiments, high optical performance is realized while the converter lens RCL is made compact.

Numerical Examples

The numerical example of the master lens ML described above and the numerical examples 1 to 6 corresponding to the converter lenses RCL according to the first to sixth embodiments, respectively are shown below.

Further, in each numerical example, a surface number indicates an order of an optical surface from the object side. r is a radius of curvature of the optical surface (mm), d at the surface number i is a distance (mm) between the i-th optical surface and the (i+1)-th optical surface, and nd is a refractive index of a material of an optical member at the d line, vd is an Abbe number of the material of the optical member based on the d line. The Abbe number is defined as vd=(Nd−1)/(NF−NC) when refractive indices at the d line (587.56 nm), the F line (486.1 nm), and the C line (656.3 nm) in the Fraunhofer line are Nd, NF, and NC, respectively.

BF indicates a back focus. The back focus in the numerical example of the master lens ML is a distance on the optical axis from the most image-side surface to the paraxial image surface, which is expressed in air-converted length.

A total lens length in the numerical example of the master lens ML is a length with the back focus added to a distance on the optical axis from the most object-side surface (first lens surface) of the master lens ML to the most image-side surface (final lens surface) of the master lens ML. A total lens length in the numerical examples of the converter lens RCL is a distance on the optical axis from the most object-side surface (first lens surface) of the converter lens RCL to the most image-side surface (final lens surface) of the converter lens RCL.

A distance between the master lens ML and the converter lens RCL is a distance on the optical axis from the most image-side surface of the master lens ML to the most object-side surface of the converter lens RCL. The distance between the master lens ML and the converter lens RCL is expressed by an air conversion length.

A front principal point position is a distance from the most object-side surface to a front principal point, and a rear principal point position is a distance from the most mage-side surface to a rear principal point. Each numerical value for the front principal point position and the rear principal point position is a paraxial amount, and the sign is positive from the object side to the image side.

Table 1 shows physical quantities used in the above conditional expressions and values of the conditional expressions in each of the numerical examples 1 to 6. In Table 1, BR1 is a radius of curvature of the image-side lens surface of the lens element adjacent to the object side of the lens element LS.

Master Lens—Common to Numerical Examples 1 to 6 of the Converter Lens unit mm surface data

| surface number | r | d | nd | vd | θgF |
|---|---|---|---|---|---|
| 1 | 147.291 | 15.31 | 1.59522 | 67.74 | 0.5442 |
| 2 | 497.553 | 135.95 | | | |
| 3 | 93.917 | 15.46 | 1.43700 | 95.10 | 0.5326 |
| 4 | −169.659 | 1.50 | 1.80610 | 33.27 | 0.5881 |
| 5 | 85.058 | 2.78 | | | |
| 6 | 81.980 | 11.17 | 1.43700 | 95.10 | 0.5326 |
| 7 | ∞ | 30.12 | | | |
| 8 | 64.700 | 7.23 | 1.89286 | 20.36 | 0.6393 |
| 9 | 117.746 | 0.20 | | | |
| 10 | 53.244 | 2.00 | 1.83400 | 37.16 | 0.5776 |
| 11 | 34.348 | 8.98 | 1.43700 | 95.10 | 0.5326 |
| 12 | 71.295 | 7.95 | | | |
| 13(stop) | ∞ | 5.00 | | | |
| 14 | −424.241 | 1.60 | 1.61800 | 63.40 | 0.5395 |
| 15 | 56.377 | 38.46 | | | |
| 16 | 192.506 | 1.40 | 1.89286 | 20.36 | 0.6393 |
| 17 | 120.766 | 4.96 | 1.51742 | 52.43 | 0.5564 |
| 18 | −71.885 | 1.00 | | | |
| 19 | 61.529 | 4.26 | 1.80610 | 33.27 | 0.5881 |
| 20 | −244.681 | 1.20 | 1.53775 | 74.70 | 0.5392 |
| 21 | 29.916 | 6.46 | | | |
| 22 | −88.814 | 1.20 | 1.72916 | 54.68 | 0.5444 |
| 23 | 62.251 | 2.54 | | | |
| 24 | 94.888 | 4.00 | 1.65412 | 39.68 | 0.5737 |
| 25 | −343.957 | 6.25 | | | |
| 26 | 45.503 | 9.29 | 1.64769 | 33.79 | 0.5938 |
| 27 | −81.900 | 1.70 | 1.80810 | 22.76 | 0.6307 |
| 28 | 81.305 | 6.55 | | | |
| 29 | 64.484 | 5.47 | 1.56732 | 42.82 | 0.5731 |
| 30 | 294.428 | 39.00 | | | |
| image plane | ∞ | | | | | various data

| | |
|---|---|
| focal length | 392.00 |
| F number | 2.90 |
| half angle of view (deg) | 3.16 |
| image height | 21.64 |
| total lens length | 379.01 |
| BF | 39.00 |

Converter Lens

Numerical Example 1 unit mm surface data

| surface number | r | d | nd | vd |
|---|---|---|---|---|
| 1 | 800.000 | 3.97 | 1.85478 | 24.8 |
| 2 | −64.600 | 5.05 | | |
| 3 | −41.053 | 1.50 | 1.88300 | 40.8 |
| 4 | 109.415 | 7.84 | 1.53172 | 48.8 |
| 5 | −33.368 | 0.67 | | |
| 6 | −43.314 | 1.50 | 1.90043 | 37.4 |
| 7 | 176.343 | 10.11 | 1.51742 | 52.4 |
| 8 | −22.583 | 1.60 | 1.90043 | 37.4 |
| 9 | −125.408 | 2.17 | | |
| 10 | −84.365 | 7.82 | 1.63980 | 34.5 |
| 11 | −30.377 | | | | unit mm various data

| | |
|---|---|
| focal length | −152.43 |
| total lens length | 42.23 |
| front principal point position | −10.55 |
| rear principal point position | −50.64 |
| lateral magnification | 1.400 |
| distance between master lens and converter lens of numerical example 1 | 6.00 |

Numerical Example 2 unit mm surface data

| surface number | r | d | nd | vd |
|---|---|---|---|---|
| 1 | −950.000 | 3.58 | 1.85478 | 24.8 |
| 2 | −66.032 | 6.38 | | |
| 3 | −37.438 | 1.50 | 1.83481 | 42.7 |
| 4 | 50.700 | 8.47 | 1.59270 | 35.3 |
| 5 | −34.559 | 0.50 | | |
| 6 | −48.892 | 1.50 | 2.05090 | 26.9 |
| 7 | −312.865 | 9.05 | 1.51823 | 58.9 |
| 8 | −23.145 | 1.60 | 1.90043 | 37.4 |
| 9 | −113.938 | 2.16 | | |
| 10 | −80.217 | 7.64 | 1.67300 | 38.3 |
| 11 | −30.317 | | | | various data

| | |
|---|---|
| focal length | −20.1.84 |
| total lens length | 42.38 |
| front principal point position | −24.66 |
| rear principal point position | −69.72 |
| lateral magnification | 1.399 |
| distance between master lens and converter lens of numerical example 2 | 6.00 |

Numerical Example 3 unit mm surface data

| surface number | r | d | nd | vd |
|---|---|---|---|---|
| 1 | ∞ | 3.32 | 1.85478 | 24.8 |
| 2 | −58.256 | 3.22 | | |
| 3 | −56.595 | 1.30 | 1.77250 | 49.6 |
| 4 | 68.517 | 6.43 | 1.60342 | 38.0 |
| 5 | −42.322 | 1.30 | 2.00100 | 29.1 |
| 6 | −351.582 | 3.55 | | |
| 7 | −61.010 | 9.54 | 1.51742 | 52.4 |
| 8 | −20.182 | 1.65 | 1.95375 | 32.3 |
| 9 | −73.911 | 2.85 | | |
| 10 | −70.983 | 7.36 | 1.63980 | 34.5 |
| 11 | −28.545 | | | | various data

| | |
|---|---|
| focal length | −204.04 |
| total lens length | 40.52 |
| front principal point position | −25.29 |
| rear principal point position | −69.31 |
| lateral magnification | 1.400 |
| distance between master lens and converter lens of numerical example 3 | 6.00 |

Numerical Example 4 unit mm surface data

| surface number | r | d | nd | vd |
|---|---|---|---|---|
| 1 | 174.802 | 2.35 | 1.80809 | 22.8 |
| 2 | −85.576 | 4.35 | | |
| 3 | −71.639 | 1.20 | 1.90043 | 37.4 |
| 4 | 15.694 | 10.00 | 1.67300 | 38.3 |
| 5 | −29.375 | 1.20 | 1.85150 | 40.8 |
| 6 | 36.929 | 0.20 | | |
| 7 | 31.316 | 5.07 | 1.73800 | 32.3 |
| 8 | −149.258 | 4.46 | | |
| 9 | −65.254 | 1.50 | 1.90043 | 37.4 |
| 10 | 32.260 | 11.79 | 1.67300 | 38.3 |
| 11 | −29.549 | 1.60 | 2.00100 | 29.1 |
| 12 | −367.485 | 1.95 | | |
| 13 | −317.571 | 11.11 | 1.54814 | 45.8 |
| 14 | −26.170 | | | | various data

| | |
|---|---|
| focal length | −102.03 |
| total lens length | 56.78 |
| front principal point position | −17.91 |
| rear principal point position | −88.12 |
| lateral magnification | 1.996 |
| distance between master lens and converter lens of numerical example 4 | 6.00 |

Numerical Example 5 unit mm surface data

| surface number | r | d | nd | vd |
|---|---|---|---|---|
| 1 | 283.876 | 3.16 | 1.80518 | 25.5 |
| 2 | −63.013 | 4.55 | | |
| 3 | −46.064 | 1.20 | 1.90043 | 37.4 |
| 4 | 17.000 | 11.24 | 1.62004 | 36.3 |
| 5 | −28.689 | 1.20 | 1.81600 | 46.6 |
| 6 | 56.337 | 0.40 | | |
| 7 | 34.441 | 4.93 | 1.72047 | 34.7 |
| 8 | −714.041 | 5.12 | | |
| 9 | −155.619 | 1.50 | 1.90043 | 37.4 |
| 10 | 29.662 | 12.58 | 1.60342 | 38.0 |
| 11 | −40.057 | 0.80 | | |
| 12 | −39.850 | 1.80 | 1.80809 | 22.8 |
| 13 | 315.104 | 11.93 | 1.56732 | 42.8 |
| 14 | −21.613 | | | | various data

| | |
|---|---|
| focal length | −164.23 |
| total lens length | 60.41 |
| front principal point position | −49.11 |
| rear principal point position | −150.99 |
| lateral magnification | 2.000 |
| distance between master lens and converter lens of numerical example 5 | 6.00 |

Numerical Example 6 unit mm surface data

| surface number | r | d | nd | vd |
|---|---|---|---|---|
| 1 | 102.255 | 3.69 | 1.80518 | 25.5 |
| 2 | −76.294 | 3.24 | | |
| 3 | −61.063 | 1.20 | 1.90043 | 37.4 |
| 4 | 16.888 | 10.64 | 1.60342 | 38.0 |
| 5 | −34.524 | 1.20 | 1.81600 | 46.6 |
| 6 | 37.047 | 0.46 | | |
| 7 | 26.804 | 6.35 | 1.66565 | 35.6 |
| 8 | −95.813 | 3.46 | | |
| 9 | −35.439 | 1.50 | 1.90043 | 37.4 |
| 10 | 26.155 | 13.21 | 1.66565 | 35.6 |
| 11 | −37.965 | 0.25 | | |
| 12 | −56.043 | 1.80 | 1.92286 | 20.9 |
| 13 | 1008.919 | 12.42 | 1.51742 | 52.4 |
| 14 | −26.712 | | | | various data

| | |
|---|---|
| focal length | −133.43 |
| total lens length | 59.42 |
| front principal point position | −33.72 |
| rear principal point position | −120.50 |
| lateral magnification | 2.000 |
| distance between master lens and converter lens of numerical example 6 | 6.00 |

TABLE 1

| | Numerical Example | | | | | |
|---|---|---|---|---|---|---|
| | 1 | 2 | 3 | 4 | 5 | 6 |
| f | −152.434 | −201.841 | −204.035 | −102.030 | −164.225 | −133.435 |
| mP | 4 | 4 | 4 | 5 | 5 | 5 |
| mN | 3 | 3 | 3 | 4 | 4 | 4 |
| LR2 | −30.377 | −30.317 | −28.545 | −26.170 | −27.713 | −26.712 |
| AR1 | −125.408 | −113.938 | −73.911 | −367.485 | −40.057 | −37.965 |

TABLE 1-continued

| | Numerical Example | | | | | |
|---|---|---|---|---|---|---|
| | 1 | 2 | 3 | 4 | 5 | 6 |
| AR2 | −84.365 | −80.217 | −70.983 | −317.571 | −39.850 | −56.043 |
| BR1 | −33.368 | −34.559 | −351.582 | −149.258 | −714.041 | −95.813 |
| BR2 | −43.314 | −48.892 | −61.010 | −65.254 | −155.619 | −35.439 |
| nAP | 1.63593 | 1.65968 | 1.65385 | 1.68805 | 1.66329 | 1.65146 |
| nAN | 1.89462 | 1.92871 | 1.90908 | 1.91334 | 1.85624 | 1.88493 |
| fLP | 70.221 | 68.216 | 69.895 | 51.337 | 45.473 | 50.500 |
| f1 | 70.077 | 82.866 | 68.153 | 71.382 | 64.304 | 54.770 |
| nLP | 1.63980 | 1.67300 | 1.63980 | 1.54814 | 1.56732 | 1.51742 |
| LR2/AR2 | 0.360 | 0.378 | 0.402 | 0.082 | 0.695 | 0.477 |
| LR2/AR1 | 0.242 | 0.266 | 0.386 | 0.071 | 0.692 | 0.704 |
| LR2/BR2 | 0.701 | 0.620 | 0.468 | 0.401 | 0.178 | 0.754 |
| AR2/AR1 | 0.673 | 0.704 | 0.960 | 0.864 | 0.995 | 1.476 |
| \|fLP/f\| | 0.461 | 0.338 | 0.343 | 0.503 | 0.277 | 0.378 |
| SFL | −2.125 | −2.215 | −2.345 | −1.180 | −5.567 | −2.821 |
| \|f1/f\| | 0.460 | 0.411 | 0.334 | 0.700 | 0.392 | 0.410 |

Embodiment of Image-Capturing Apparatus

Figure 15A:
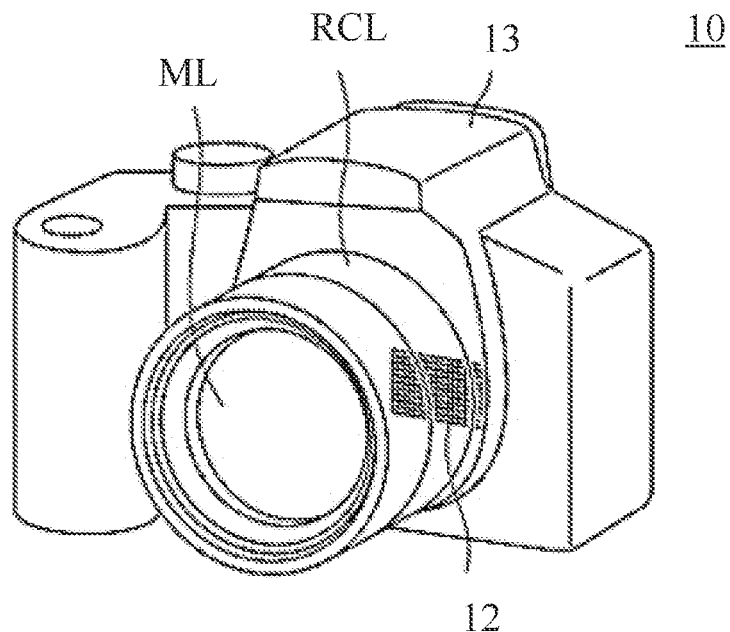
FIGS. 15A and 15B illustrate a configuration of an image-capturing system.
Figure 15B:
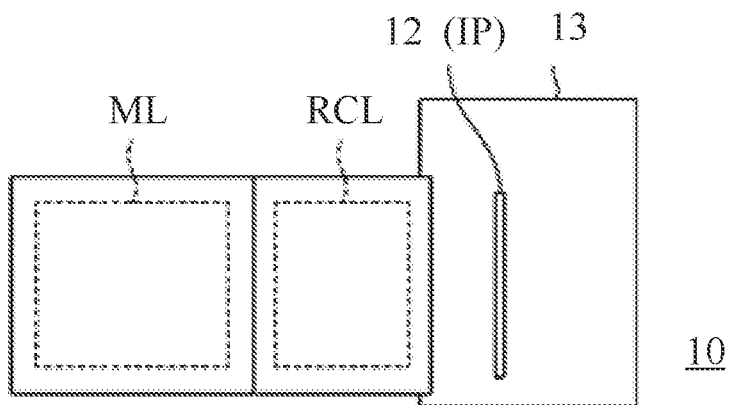

FIGS. 15A and 15B are diagrams illustrating a configuration of an image-capturing apparatus (digital camera) 10. FIG. 15A is a perspective view and FIG. 15B is a side view. The image-capturing apparatus 10 includes a camera body 13, a master lens ML, a converter lens RCL that is the same as any of the first to sixth embodiments described above, and a light-receiving element (image sensor) 12. The light-receiving element (image sensor) 12 photoelectrically converts an image formed by the master lens ML and the converter lens RCL. As the light-receiving element 12, an image sensor such as a CCD sensor or a CMOS sensor can be used. The master lens ML and the converter lens RCL may be integrally formed with the camera body 13 or may be detachably attached to the camera body 13. When the master lens ML and the converter lens RCL are formed integrally with the camera body 13, the converter lens RCL is configured to be insertable/removable on the optical axis.

Embodiment of Interchangeable Lens

The present invention can be applied to an interchangeable lens in which the master lens ML and the converter lens RCL are configured in the same lens barrel and which can be detachably attached to the image-capturing apparatus. The master lens ML may be a single focus lens or a zoom lens. In this case, the converter lens RCL is configured to be insertable/removable on the optical axis. The converter lens RCL is arranged on or off the optical axis according to an instruction from a user via an operation member or a user interface.

Although the preferred embodiments of the present invention have been described above, the present invention is not limited to these embodiments and examples, and various combinations, modifications and changes are possible within the scope of the gist thereof.

Embodiment of Reducing Stray Light

FIGS. 16A and 16B are diagrams schematically illustrating a stray light reduction effect of the converter lens RCL. FIG. 16A is a diagram schematically illustrating an image-forming property of the stray light due to reflection on the image-side refractive surface and the object-side refractive surface of the lens arranged closest to the image side in the converter lens. FIG. 16B is a diagram schematically illustrating the image-forming property of the stray light due to reflection of a light-receiving element (image sensor) 21 for photoelectric conversion, an LPF (low pass filter) or an infrared cut filter arranged near the light-receiving element, and the converter lens.

As illustrated in FIGS. 16A and 16B, it can be seen that the image formation of the stray light can be suppressed by adopting the configuration described in each embodiment.

According to the above-mentioned embodiments, it is possible to obtain the converter lens having high optical performance by suppressing the stray light when it is disposed on the image side of the master lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-206289, filed on Nov. 14, 2019 which is hereby incorporated by reference herein in its entirety.

What is claimed is:

1. A converter lens having a negative refractive power, which is disposed on an image side of a master lens to make a focal length of an entire system longer than a focal length of the master lens alone, the converter lens comprising:
a most image-side lens element disposed closest to an image side in the converter lens,
wherein the most image-side lens element has a lens surface having a convex shape toward an image side,
wherein a lens disposed closest to an image side in the converter lens has a positive refractive power, and
wherein the following conditional expressions are satisfied:

$mN < mP$ $0.0 \leq LR2/AR2 < 1.0$ where mP is the number of positive lens components of the converter lens, mN is the number of negative lens components of the converter lens, LR2 is a radius of curvature of an image-side lens surface of the most image-side lens element, and AR2 is a radius of curvature of an object-side lens surface of the most image-side lens element.

2. The converter lens according to claim 1,
wherein the converter lens includes at least two positive lenses, and wherein the following conditional expression is satisfied:

$$1.58 < nAP < 1.80$$

where nAP is an average refractive index at a d line of materials of all positive lenses included in the converter lens.

3. The converter lens according to claim 1,
wherein the converter lens includes at least one negative lens, and
wherein the following conditional expression is satisfied:

$$1.80 < nAN < 2.20$$

where nAN is an average refractive index at a d line of materials of all negative lenses included in the converter lens.

4. The converter lens according to claim 1, further comprising:
a lens element adjacent to an object side of the most image-side lens element,
wherein the following conditional expression is satisfied:

$$0.0 \leq LR2/AR1 < 0.9$$

where AR1 is a radius of curvature of an image-side lens surface of the lens element adjacent to an object side of the most image-side lens element.

5. The converter lens according to claim 1,
wherein the most image-side lens element includes a single lens having a positive refractive power, which is disposed closest to an image side, and
wherein the following conditional expression is satisfied:

$$0.05 < |fLP/f| < 0.60$$

where fLP is a focal length of the single lens and f is a focal length of the converter lens.

6. The converter lens according to claim 1,
wherein the most image-side lens element includes a single lens having a positive refractive power, which is disposed closest to an image side, and
wherein the following conditional expression is satisfied:

$$1.45 < nLP < 1.75$$

where nLP is an average refractive index at a d line of materials of the single lens.

7. The converter lens according to claim 1, further comprising:
a lens element adjacent to an object side of the most image-side lens element,
wherein the following conditional expression is satisfied:

$$0.0 \leq LR2/BR2 < 1.0$$

where BR2 is a radius of curvature of an object-side lens surface of the lens element adjacent to an object side of the most image-side lens element.

8. The converter lens according to claim 1, further comprising:
a lens element adjacent to an object side of the most image-side lens element,
wherein the following conditional expression is satisfied:

$$0.4 < AR2/AR1 < 2.0$$

where AR1 is a radius of curvature of an image-side lens surface of the lens element adjacent to an object side of the most image-side lens element.

9. The converter lens according to claim 1,
wherein the following conditional expression is satisfied:

$$-7.0 < SFL < -1.0$$

where SFL is a shape factor of the most image-side lens element.

10. The converter lens according to claim 1, further comprising:
a most object-side lens element disposed closest to an object side in the converter lens,
wherein the following conditional expression is satisfied:

$$0.1 < |f1/f| < 0.9$$

where f1 is a focal length of the most object-side lens element and f is a focal length of the converter lens.

11. The converter lens according to claim 1, further comprising:
a cemented lens in which a negative lens, a positive lens, and a negative lens are cemented in order from an object side to an image side.

12. The converter lens according to claim 1, further comprising:
a most object-side lens element disposed closest to an object side in the converter lens; and
a lens element adjacent to an image side of the most object-side lens element,
wherein an object-side lens surface of the lens element adjacent to an image side of the most object-side lens element is concave toward an object side.

13. The converter lens according to claim 1, further comprising:
a most object-side lens element disposed closest to an object side in the converter lens; and
a lens element adjacent to an image side of the most object-side lens element,
wherein an image-side lens surface of the lens element adjacent to an image side of the most object-side lens element is concave toward an image side.

14. The converter lens according to claim 1,
wherein the most image-side lens element has a positive refractive power.

15. The converter lens according to claim 1,
wherein all lenses that compose the converter lens are spherical lenses.

16. The converter lens according to claim 1,
wherein the converter lens consists of, in order from an object side to an image side, a first lens element which is a positive single lens, a second lens element which is a cemented lens in which a negative lens and a positive lens are cemented, a third lens element which is a cemented lens in which a negative lens, a positive lens, and a negative lens are cemented, and a fourth lens element which is a positive single lens.

17. The converter lens according to claim 1,
wherein the converter lens consists of, in order from an object side to an image side, a first lens element which is a positive single lens, a second lens element which is a cemented lens in which a negative lens, a positive lens, and a negative lens are cemented, a third lens element which is a cemented lens in which a positive lens and a negative lens are cemented, and a fourth lens element which is a positive single lens.

18. The converter lens according to claim 1,
wherein the converter lens consists of, in order from an object side to an image side, a first lens element which is a positive single lens, a second lens element which is a cemented lens in which a negative lens, a positive lens, and a negative lens are cemented, a third lens element which is a positive single lens, and a fourth lens element which is a cemented lens in which a negative lens, a positive lens, and a negative lens are cemented, and a fifth lens element which is a positive single lens.

19. The converter lens according to claim 1,
wherein the converter lens consists of, in order from an object side to an image side, a first lens element which is a positive single lens, a second lens element which is a cemented lens in which a negative lens, a positive lens, and a negative lens are cemented, a third lens element which is a positive single lens, a fourth lens element which is a cemented lens in which a negative lens and a positive lens are cemented, and a fifth lens element which is a cemented lens in which a negative lens and a positive lens are cemented.

20. An interchangeable lens comprising:
a master lens; and
a converter lens having a negative refractive power, which is disposed on an image side of the master lens to make a focal length of an entire system longer than a focal length of the master lens alone,
wherein the converter lens includes a most image-side lens element disposed closest to an image side in the converter lens,
wherein the most image-side lens element has a lens surface having a convex shape toward an image side,
wherein a lens disposed closest to an image side in the converter lens has a positive refractive power, and
wherein the following conditional expressions are satisfied:

$$mN<mP$$

$$0.0 \leq LR2/AR2 < 1.0$$

where mP is the number of positive lens components of the converter lens, mN is the number of negative lens components of the converter lens, LR2 is a radius of curvature of an image-side lens surface of the most image-side lens element, and AR2 is a radius of curvature of an object-side lens surface of the most image-side lens element.

21. An image-capturing apparatus comprising:
a master lens;
a converter lens having a negative refractive power, which is disposed on an image side of the master lens to make a focal length of an entire system longer than a focal length of the master lens alone; and
an image sensor configured to receive an image formed by the converter lens,
wherein the converter lens includes a most image-side lens element disposed closest to an image side in the converter lens,
wherein the most image-side lens element has a lens surface having a convex shape toward an image side,
wherein a lens disposed closest to an image side in the converter lens has a positive refractive power, and
wherein the following conditional expressions are satisfied:

$$mN<mP$$

$$0.0 \leq LR2/AR2 < 1.0$$

where mP is the number of positive lens components of the converter lens, mN is the number of negative lens components of the converter lens, LR2 is a radius of curvature of an image-side lens surface of the most image-side lens element, and AR2 is a radius of curvature of an object-side lens surface of the most image-side lens element.

* * * * *